US008358327B2

(12) United States Patent
Duddy et al.

(10) Patent No.: US 8,358,327 B2
(45) Date of Patent: Jan. 22, 2013

(54) CODEC-DRIVEN TOUCH SCREEN VIDEO CONFERENCING CONTROL SYSTEM

(75) Inventors: Thomas D. Duddy, Louisville, KY (US); Mark Fauth, Louisville, KY (US); Stanley J. Bartsch, Covington, KY (US); Mark Klarer, Louisville, KY (US); Barry J. Sawayer, Louisville, KY (US)

(73) Assignee: Trinity Video Communications, Inc.

( * ) Notice: Subject to any disclaimer, the term of this patent is extended or adjusted under 35 U.S.C. 154(b) by 1586 days.

(21) Appl. No.: 11/826,872

(22) Filed: Jul. 19, 2007

(65) Prior Publication Data

US 2009/0021575 A1    Jan. 22, 2009

(51) Int. Cl.
*H04N 7/14*   (2006.01)
(52) U.S. Cl. ............... 348/14.03; 348/14.09; 348/14.11
(58) Field of Classification Search ..... 348/14.01–14.16
See application file for complete search history.

(56) References Cited

U.S. PATENT DOCUMENTS

| | | | | |
|---|---|---|---|---|
| 4,516,156 A | * | 5/1985 | Fabris et al. | 348/14.1 |
| 4,987,492 A | * | 1/1991 | Stults et al. | 348/14.08 |
| 5,793,415 A | * | 8/1998 | Gregory et al. | 348/14.1 |
| 7,231,603 B2 | * | 6/2007 | Matsumoto | 715/716 |
| 2007/0171273 A1 | * | 7/2007 | Saleh et al. | 348/14.08 |
| 2008/0246834 A1 | * | 10/2008 | Lunde et al. | 348/14.09 |

* cited by examiner

*Primary Examiner* — Curtis Kuntz
*Assistant Examiner* — Ryan Robinson
(74) *Attorney, Agent, or Firm* — H. Jay Spiegel (57) ABSTRACT

A CODEC-driven touch screen video conferencing control system provides a touch screen entry and display device that interfaces with the CODEC of the existing video conferencing system so that remote operation is compatible with the pre-programming of the video conferencing system. A computer with video capture device captures the output video of the video conferencing CODEC and transmits it to the touch screen so that what is displayed on the touch screen is all of the controls for the video conferencing system as pre-programmed by the video conferencing system manufacturer. There is no requirement to employ a cursor on the video conferencing monitor screen. In fact, through use of the present invention, none of the control functions of the video conferencing system appear on its monitor screens. Rather, those functions are solely displayed on the touch screen of the remote control device.

18 Claims, 6 Drawing Sheets

Schematic Representation of the Touch Screen of the Present Invention

Figure 1. Prior Art

Figure 2. Schematic Representation of the Touch Screen of the Present Invention

FIGURE 3
TRINITY SYSTEM CONNECTIONS

FIGURE 5
TRINITY SYSTEM OPERATIONAL STEPS

Figure 6. Touch Capture

CODEC-DRIVEN TOUCH SCREEN VIDEO CONFERENCING CONTROL SYSTEM

BACKGROUND OF THE INVENTION

The present invention relates to a CODEC-driven touch screen video conferencing control system. In the prior art, video conferencing systems customarily include a coder and decoder described as the "CODEC" which performs the functions of compaction of video signals to a volume that can be transmitted, and de-compaction of video signals to a volume that can be displayed. Output of the CODEC typically determines the look and feel of the display screens or monitors of the video conferencing system.

Known video conferencing systems generally fall into two categories. In a first category, control is carried out through the use of a "dumb" handheld remote control device. Other video conferencing systems may also utilize a touch screen entry and display device backed by an appliance such as a personal computer that has intelligence and is capable of being programmed. In the former case, where a "dumb" handheld remote control device is employed, the remote control device typically has buttons that, when depressed, transmit command codes or information in the form of numbers and letters, via infra-red methodology to a CODEC. Such remote control devices do not have intelligence and are only able to perform actions specifically dictated as a result of depression of specified buttons.

In the latter type of prior art video conferencing system, a touch screen is used for control, but the touch screen is typically an after-market product that has its own unique screen programming that does not relate to the screen programming provided by the video conferencing device manufacturer. Such touch screen control systems are driven by programs that reside in an intelligent appliance such as a personal computer. They present touch screen control screens of their own creation and design rather than those of the manufacturer of the video conferencing system. As a result, there is no actual or implied consistency from system to system because the programmer of the touch screen device is free to implement control screens in any way or manner he or she chooses without regard to the look and feel of the video conferencing system on which the touch screen is operating. Additionally, in such installations, the regions on the touch screen corresponding to functions of the manufacturer's controls are typically displayed on one of the system monitors as well, although sometimes the prior art touch screen is designed to suppress those control displays.

Figure 1:
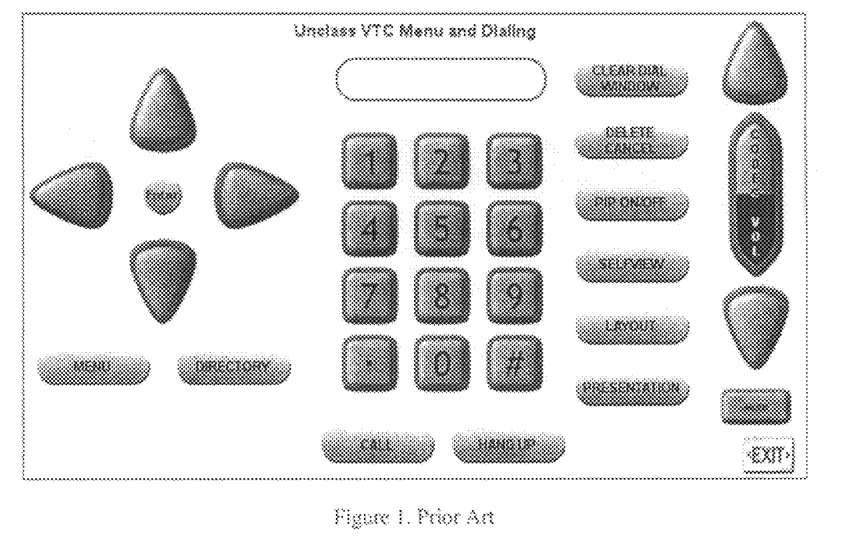
FIG. 1 shows a schematic representation of the prior art.
Figure 2:
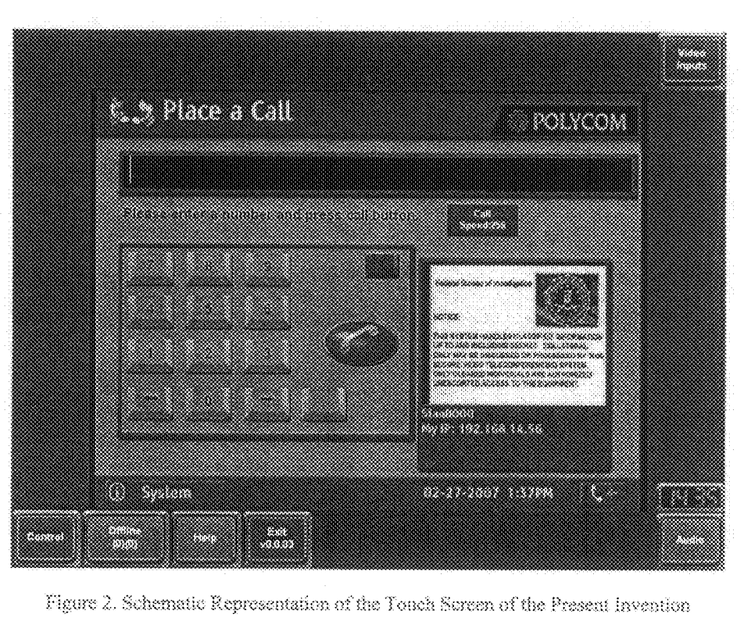
FIG. 2 shows a schematic representation of the touch screen of the present invention.

FIG. 1 shows a schematic representation of a touch control screen, which is generally designated by the reference numeral 1, created for a prior art video conferencing system. In the type of system illustrated in FIG. 2, the look and feel of the screen display of the video conferencing system manufacturer is not captured or duplicated. Rather, the video conferencing system screen is essentially re-programmed to perform functions in a manner, sequence and form chosen by the individual programmer of the touch control screen. In the prior art system shown in FIG. 1, control functions may be displayed on the user viewed screen or video conferencing monitor, although, as explained above, they are sometimes suppressed. Additionally, operation of the prior art system requires that a cursor on the video conferencing screen be moved to an appropriate area using the directional arrows 2 shown, whereupon an enter button 3 is depressed to control resultant functions.

It would be desirable to develop a control system for a video conferencing system that would be compatible with the video conferencing system and act upon the video conferencing system's pre-programmed screen look and feel to enhance compatibility and effectiveness of operation. It is with this thought in mind that the present invention was developed.

SUMMARY OF THE INVENTION

The present invention relates to a CODEC-driven touch screen video conferencing control system. The present invention includes the following interrelated objects, aspects and features:

(1) In a first aspect of the present invention, it is intended to provide a touch screen entry and display device that interfaces with the CODEC of the existing video conferencing system so that remote operation is compatible with the pre-programming of the video conferencing system.

(2) In accordance with the teachings of the present invention, the inventive touch screen captures the output video of the video conferencing CODEC so that what is displayed on the touch screen is all of the controls for the video conferencing system as pre-programmed by the video conferencing system manufacturer.

(3) In an important aspect of the present invention, since the present invention is the first to capture the control screens of the CODEC manufacturer, the control process is the same for all systems in accordance with the teachings of the present invention as it is for all manufacturer supplied video conferencing systems.

(4) Thus, every system in accordance with the teachings of the present invention has the same look and feel and operation as any other system since it uses the same control screens and processes as the CODEC-manufacturer-created systems.

(5) In a further aspect, in accordance with the teachings of the present invention, there is no requirement to employ a cursor on the video conferencing monitor screen. In fact, through use of the present invention, none of the control functions of the video conferencing system appear on its monitor screens. Rather, those functions are solely displayed on the touch screen of the remote control device.

Accordingly, it is a first object of the present invention to provide a CODEC-driven touch screen video conferencing control system.

It is a further object of the present invention to provide such a system in which the screen display of the existing video conferencing system is captured and displayed on the touch screen remote control.

It is a yet further object of the present invention to provide such a system in which function displays are no longer displayed on the monitor screens of the video conferencing system.

It is a still further object of the present invention to provide such a system in which use of a cursor on the video conferencing monitor screens is no longer required.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 3:
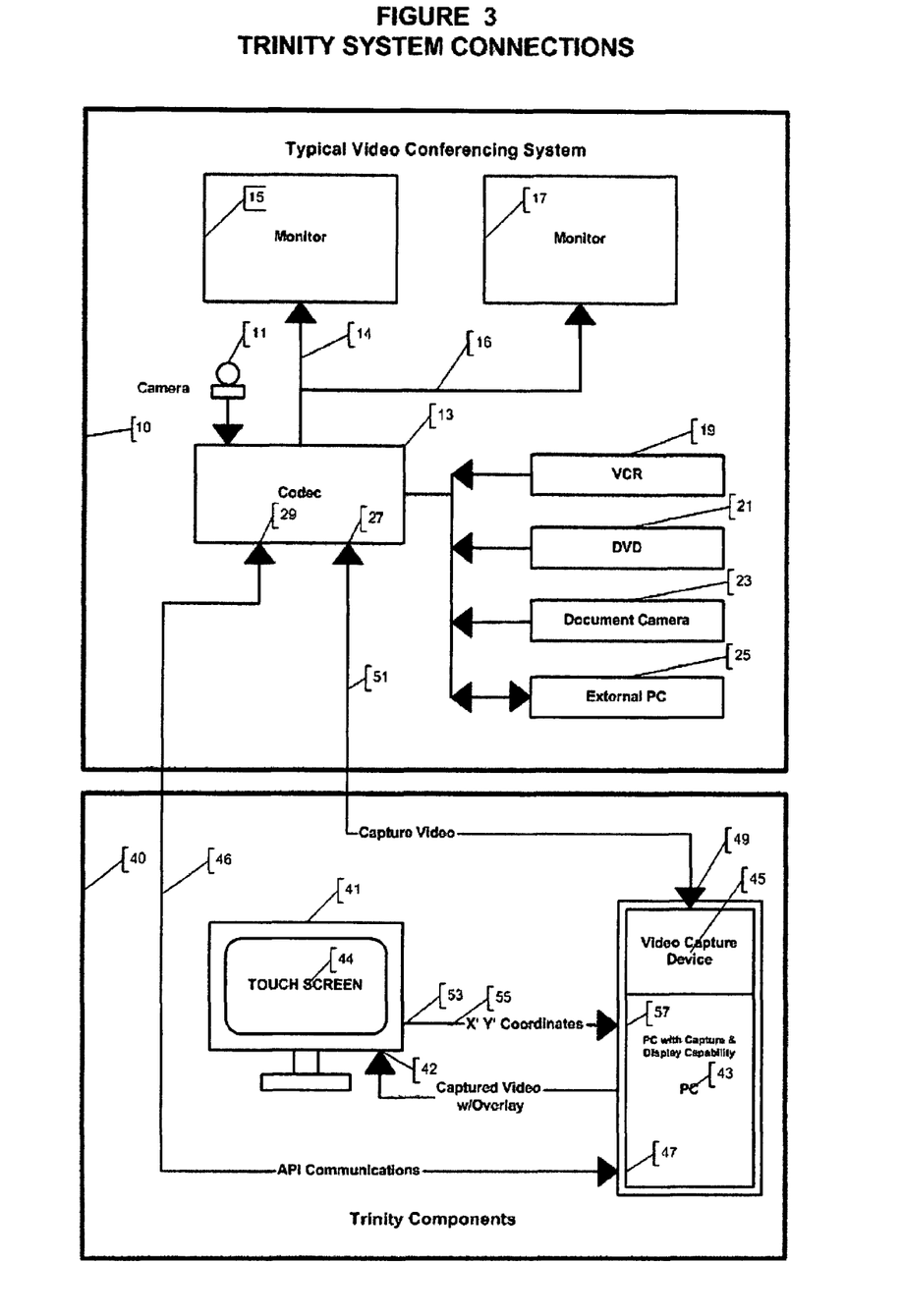
FIG. 3 shows a schematic representation of the electrical circuitry of the present invention.
Figure 4:
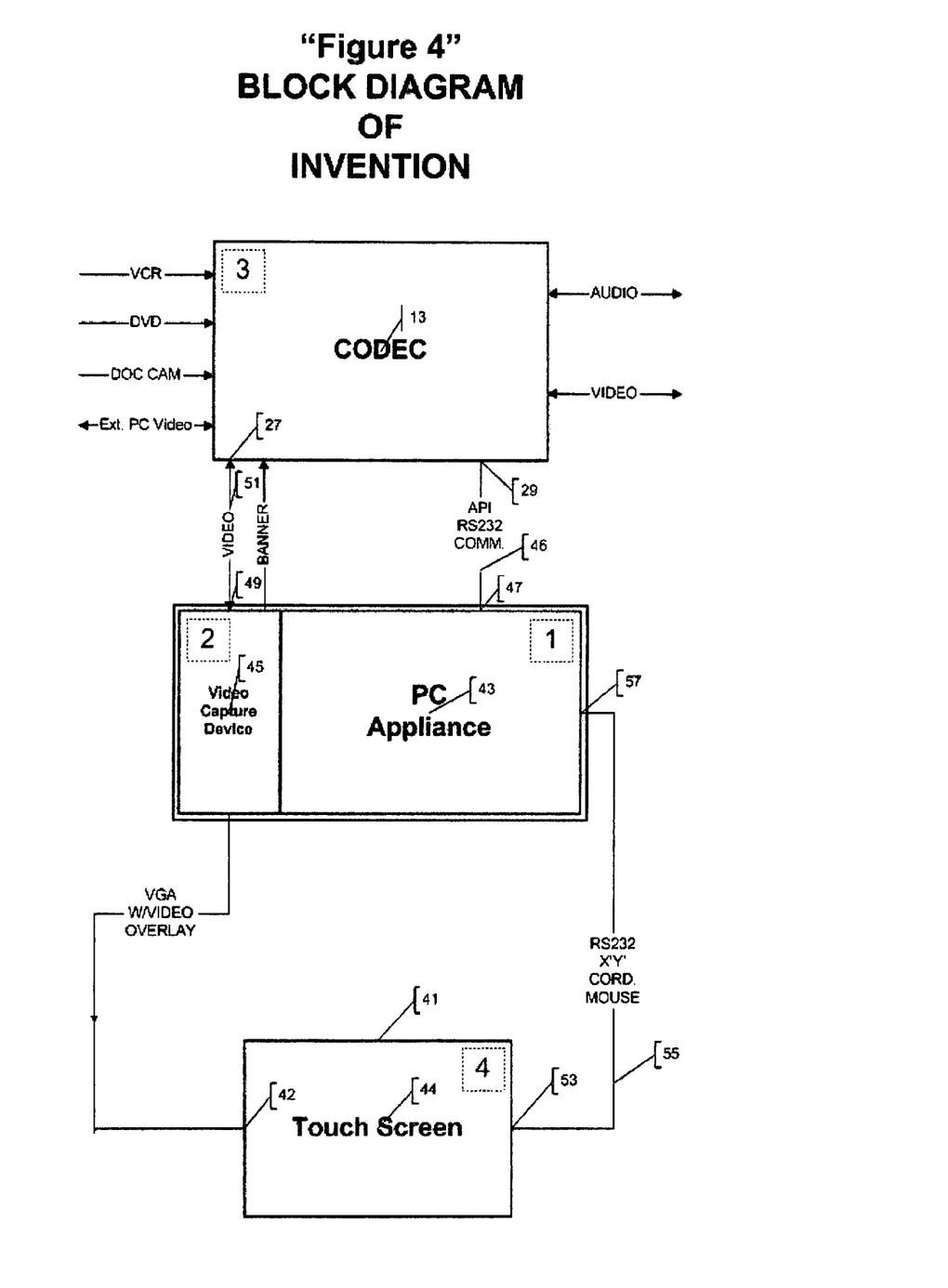
FIG. 4 shows a block diagram of the electrical circuitry of the present invention.

Reference is first made to FIGS. 3 and 4. With particular reference to FIG. 3, the typical video conferencing system known in the art is generally designated by the reference numeral 10. The system 10 includes a camera 11 supplying signals to a CODEC 13 which supplies audio-video signals to the monitors 15 and 17. The CODEC 13 may also be supplied with signals from a VCR 19, a DVD player/recorder 21, a document camera 23, and an external personal computer 25. As understood by the double-headed arrows between the CODEC 13 and the VCR and DVD player/recorder, the VCR and DVD player/recorder may be used to play programming to be displayed on the monitors 15, 17 and control signals can be sent from the CODEC to the VCR and DVD player/recorder. The VCR may be used to record programming from the CODEC 13.

With further reference to FIG. 3, the CODEC 13 has a port 27 from which capture video may be obtained. Additionally, the CODEC has an additional port 29 from which API communications are obtained. "API" is an abbreviation for "Application Programming Interface." This interface accessed via the port 29 permits the present invention to communicate with the CODEC 13 so that the present invention can provide the CODEC 13 with a desired series of commands and receive responses from the CODEC 13.

With further reference to FIG. 3, the components of the present invention are generally designated by the reference numeral 40 and are seen to include the touch screen remote control 41, a personal computer 43, and a video capture board 45. As seen, the personal computer 43 has a port 47 to which is coupled a conductor 46 coupled to the API communications port 29 of the CODEC 13. The video capture device 45 has a port 49 that is connected to the capture video port 27 of the CODEC 13 by the conductor 51.

The video capture device 45 under control of the personal computer 43 provides captured video signals to the touch screen 41 via a port 42. When a user touches the screen 44 of the touch screen 41, the x and y location coordinates corresponding to the location of touching are transmitted via the port 53 and the conductor 55 to a port 57 on the personal computer 43.

As should be understood, the personal computer 43 is pre-programmed with data that corresponds each set of x and y location coordinates corresponding to a function of the video conferencing system 10 related to the location of control of that function on the touch screen 44. In other words, the touch screen 44 is provided the pattern that would normally be displayed on the monitors 15 and 17, which pattern includes "buttons" corresponding to a variety of functions of the video conferencing system 10 as better explained with reference to FIG. 1. In accordance with the teachings of the present invention, those "buttons" are no longer displayed on the monitors 15 and 17 but, rather, are now solely displayed on the screen 44 of the touch screen 41.

Figure 6:
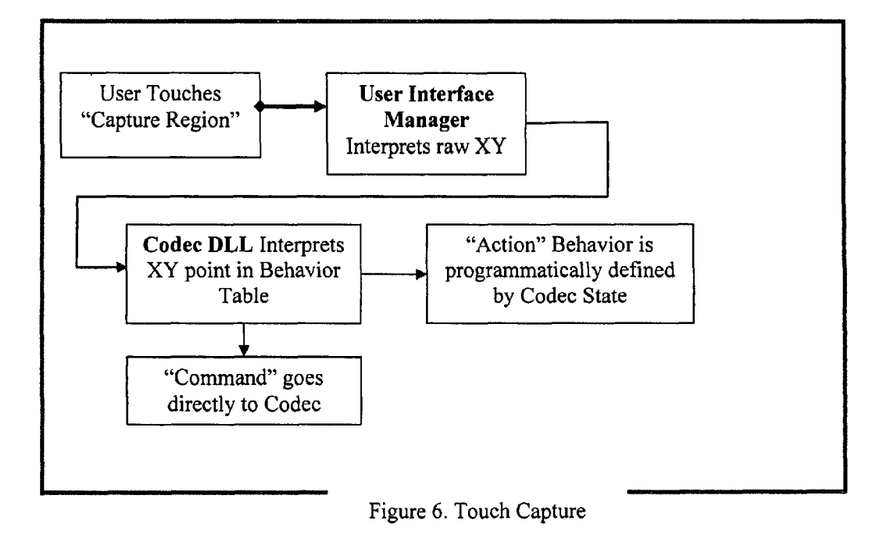
FIG. 6 shows a flowchart illustrating the method by which x and y coordinates are interpreted.

The video signals are captured from the system 10 in the following manner (see FIG. 6):

The S-Video of the monitor 15 or 17 output (which contains the control information in a manufacturer-supplied handheld-remote-controlled system) is routed from the CODEC 13 to a video capture device 45, which then places the image into a "Capture Region" as defined by a program on the PC/appliance program—cropping and scaling the image as necessary as understood by those of ordinary skill in the art.

Once the capture process is started, it proceeds automatically.

The Touch Screen Transfer Process operates as follows (FIG. 6):

When the user logs in, the CODEC 13 Dynamic Link Library (DLL) is designed to cause loading of a "Screen Behavior Definitions" file from the PC 43. This file enumerates all navigable screens in the system, and defines XY coordinate information for each region on the screen.

When the user touches the "Capture Region" of the touch screen 44, the User Interface Module in the touch screen system 41 sends the coordinates of that touch to the PC for analysis.

The PC cross references the XY coordinates against the current screen, and then takes appropriate action.

The PC is always listening for messages which inform it what screen is currently displayed.

Actions taken on a touch can be one of two general classes:
1) Command
2) Action.

A "Command" is a raw CODEC API command. These are generally things like "screen jumps," or other direct orders to the CODEC 13.

An "Action" involves invoking a general purpose subroutine (there are several such subroutines available) to determine what should actually happen. Arguments can be specified in the Action Statement to ensure proper behavior. Generally, actions verify a CODEC state before completing, or do additional command processing.

The display pattern is provided to the video capture device 45 from the port 27 of the CODEC 13, and provided to the touch screen 41 via the port 42. Thus, when a region on the screen 44 is touched by the user, the coordinates corresponding to that touching are transmitted to the personal computer 43 via the conductor 55, and thence via the port 47, conductor 46 and port 29 to effectuate control of a variety of functions on the monitors 15 and 17 via the CODEC 13 as well as the conductors 14 and 16.

As explained above, in accordance with the teachings of the present invention, use of a cursor on the screens 15 and 17 is eliminated. There is no further need to line up a cursor with a region on one of the screens 15 and 17 and press an "enter" button as is the case in the prior art system illustrated in FIG. 2. The regions on the screens 15 and 17 no longer exist—only the screen 44 of the touch screen 41 has the regions thereon with the functions of the system 10 represented in those regions.

In accordance with the teachings of the present invention, the screen 44 includes two general areas, a center rectangle that displays the exact output of the CODEC 13 and a four-sided periphery that contains control buttons for activating attendant audio-video devices such as the camera 11, VCR 19, DVD 21, document camera 23, and external PC 25, as well as control commands for CODEC 13 operation. Additionally, an area on the screen 44 is provided to facilitate display of status information about conditions of the system. Ports 42 and 53 are provided to connect the touch screen 41 to associated sub-systems of the present invention and the video conferencing system 10.

As compared to the prior art, in accordance with the teachings of the present invention, the inventive system captures the exact video output of the CODEC 13 and also inputs to the CODEC 13 a duplication of the output of the manufacturer's handheld remote device. In this way, operation is always precisely the same as designed by the manufacturer of the CODEC 13. Every implementation of the system 10 remains consistent as compared to prior art devices in which the touch screen remote control does not operate based upon the programming of the CODEC but, rather, based upon the programming of the remote control device.

FIG. 4 is similar to FIG. 3, but concentrates on the components of the present invention as explained above. Like reference numerals in FIG. 4 refer to like components in FIG. 3. The inventive system 40 permits control of all functions of the CODEC 13 through the use of the easy-to-use touch screen 44 which is controlled by the personal computer 43, an intelligent device that ensures logical operation, may give users second chances through display of a request to verify that a correct choice has been made, and guards against erroneous operations.

In more detail, the personal computer 43 is capable of executing logical instructions written in a computer programming language. The PC 43 controls operation of the video conferencing system 10 with a video capture device 45 via a PCI or other appropriate bus physically installed in the PC 43; with the CODEC 13 via a RS232 serial connection schematically represented in FIG. 4—Communications are commands that go back and forth between the port 47 of the PC and the port 29 of the CODEC. As should be understood, these communications conform to the manufacturer's Application Programming Interface (API) of the CODEC 13.

Communications also occur using the touch screen 41 via a serial communications link shown in FIG. 4 and designated by the reference numeral 55 for the conductor and 53 and 57 for the ports. As explained above, when the present invention is employed, there is no cursor displayed on the monitor screens 15 and 17. Rather, the touch screen 41 acts as a mouse, in that, when a region on the screen 44 (FIG. 3) is touched, the x and y coordinates of that location of touching are transmitted to the PC 43 via the conductor 55 and, as the PC 43 is pre-programmed, appropriate control signals are sent to the CODEC 13 via the conductor 46. If desired, the PC 43 may be programmed such that when a region on the touch screen is touched, a display is provided asking the user to touch the screen again to verify the operation.

In summary, the PC 43 executes a unique set of computer programs which initiate and control all actions of the video conferencing system 10. Logic includes:

(1) All operations of the touch screen 41 including all communications from and to the user;

(2) All operations of the video capture board 45; and (3) All requests to and messages from the CODEC 13.

If desired, the PC software may include unique password and security controls to prevent tampering. An important key to the present invention is the fact that the PC 43 operates the video conferencing system 10 via the video conferencing system's own CODEC 13 through the CODEC's API.

Figure 5:
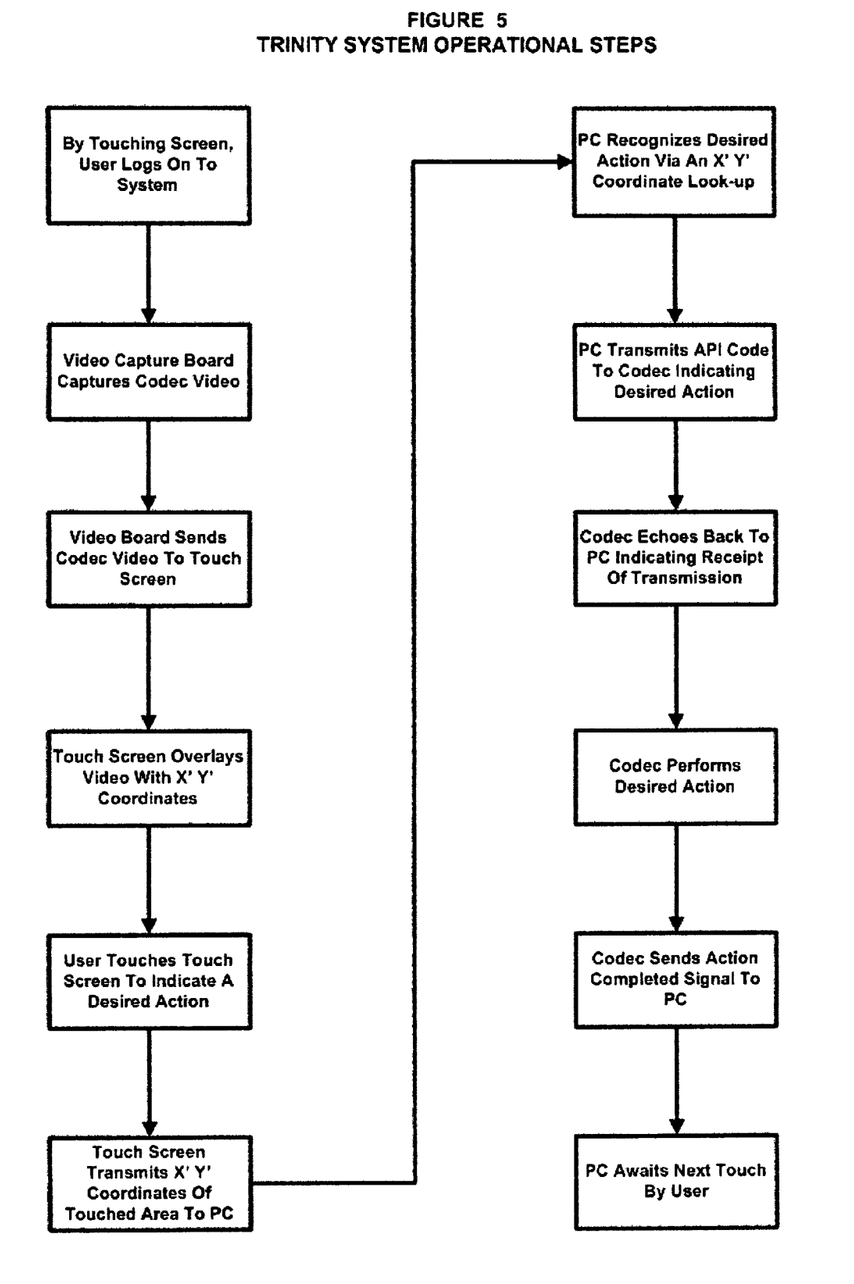
FIG. 5 shows the sequence of steps undertaken in operating the present invention.

With reference to FIG. 5, all communications between the PC 43 and the CODEC 13 follow a similar procedure. With reference to FIG. 5, when the user touches the screen 44, this causes the user to be logged on to the system 40. Thereafter, the video capture board 45 captures the video from the CODEC 13.

Next, the video capture board 45 sends the video from the CODEC 13 to the touch screen 44 via the port 27, conductor 51, port 49 and port 42 on the touch screen system 41.

As pre-programmed by the PC 43, once the CODEC video has been received by the touch screen system 41, the system 41 overlays the screen 44 with x and y coordinates corresponding to each region of the screen 44 where a function will be initiated by touching that region.

Thereafter, when a user desires to cause a function to be initiated, the user touches the touch screen at the desired region to indicate the desired action. Responsive to that touching, the touch screen system 41 transmits the x and y coordinates of the touched area to the PC 43 via the port 53, conductor 55, and port 57 (FIG. 3). A look-up table pre-programmed in the memory of the PC 43 correlates the x and y coordinates received by the PC with the desired action. Responsive thereto, the PC 43 transmits API code via the port 47, conductor 46, and port 29 to the CODEC 13. The CODEC 13 echoes back to the PC 43 via the same transmission path indicating receipt of the transmission, and then the CODEC 13 performs the desired action via one of its ports and associated conductors.

The CODEC 13 then sends an action completed signal to the PC 43 via the port 29, conductor 46, and port 47. Once the action has been completed in the manner described above, the PC 43 awaits indication of the next touch of the screen 44 by the user.

To understand the importance of the present invention, it is instructive to contrast its operation with that of the prior art manufacturer-supplied handheld control device. The present invention essentially duplicates the actions of the CODEC manufacturer's handheld remote device. In the manufacturer's version of a video conferencing system, the control screens with graphics indicating a desired action are displayed on the same device (e.g., a television screen 15, 17) that is used for viewing the video conference.

The prior art handheld remote device is pointed at the viewing device (e.g., a television screen) and an appropriate button on the handheld remote device is pressed. An infra-red signal is transmitted to the CODEC indicating the location of the graphic symbol on the viewing device and therefore the desired action. Because the handheld remote device is "dumb" (lacks logical intelligence), the sequence and logicality of the action must be determined by the user—i.e., there are no logical checks or possibilities of "second chances." The CODEC remote device (similar to virtually all handheld remote devices) is not easy to operate and is not intuitive. Often, prior art devices require use of a cursor on the monitor screens moved by the remote control to a desired region, then activated by a click. The following describes the actions of the present invention.

In the present invention, the control screens do not appear on the same viewing device (e.g., a television screen) as is used for viewing the video conference. Instead, the video of the control screen is "captured" by the video capture device (FIG. 4, Item 45) and transmitted to the touch screen display (FIG. 4, item 44). The PC also performs another function. It transmits a screen full of information to the CODEC 13 for display on the viewing device 15, 17 (e.g., a television screen), that displays the far site location in a video conference. This screen of information, which originates in the PC 43, obscures the far site from vision until it is dismissed by the local user via the touch screen. It is employed for reasons of security (i.e., to not permit viewing of the far site until approval is granted).

The CODEC 13 is a coder/decoder device manufactured by several different manufacturers. It is the central portion of a video conferencing system 10. It essentially performs all the intelligent actions of a video conferencing system with the exception of control. It determines what video source (camera, VCR, DVD, Document Camera, Personal Computer) is displayed on the viewing devices, establishes communications with the remote site(s), and accepts action commands and performs the requested action (e.g., place a video call, display a list of contacts, display a VCR, etc.).

In the present invention, how the touch screen remote control invention works is described rather than how the CODEC 13 works. The contents of the CODEC screens and the functions a CODEC performs are not centrally pertinent. What is pertinent is how the PC 43 interfaces with the CODEC 13, how API commands are processed, how commands are sent to and received from the CODEC, etc. Of special importance is what is done differently from everyone else, i.e., capturing the CODEC video screens, overlaying them with x' and y' coordinates, transmitting control codes from the touch screen 44 to the PC 43, and transmitting messages from the PC 43 to the touch screen 44.

The touch screen system 41 is comprised of an LCD screen or other video display technology (CRT, Plasma, etc.) 44 (FIG. 3) that can be of varying sizes. In addition to the display screen, the touch screen contains hardware that overlays the screen with a matrix of x' and y' coordinates. When the touch screen display is touched, it transmits a "mouse click" representing the x' and y' coordinates of the screen area to the PC 43. The PC 43 logic recognizes the location by virtue of a programmed look-up table and therefore the implied control symbol to be activated. The PC 43 transmits a code (which conforms to the API protocol of the CODEC) to the CODEC 13 via port 47, conductor 46, and port 29 (FIG. 4). The CODEC 13 then executes the desired command.

The periphery of the touch screen is lined with command and information rectangles on all four sides. These rectangles are always located in the same spots and always operate in a specific manner. The screen periphery is preferably comprised of four command areas:
Camera Control (upper left corner)
Video Inputs (upper right corner)
Audio control (lower right corner)
Functions (lower left corner).
It also has three status/help buttons:
Off/On-Line
Help (When "Help" is pressed, the following buttons appear):
Support Contacts
User Manual
Trinity Software (S MCS Module) Information
Exit (this is a rapid exit function).
When the system is engaged in a call over a transmission line, an additional "Network Statistics" button is displayed. Pressing this button permits the user to view several pages of network statistics directly from the CODEC 13.

There can be more than one camera involved in a given system (determined at system set-up time). Camera control is comprised of six buttons:
Zoom In
Zoom Out
Point Camera Left
Point Camera Right
Point Camera Up
Point Camera Down.
The buttons are pressed and held until the camera views the desired area.
The Video Inputs are comprised of five buttons:
Main Camera
DVD
VCR
Document Camera
External Computer.
Pressing one of these buttons activates that video source. It is displayed on one of the viewer's devices and remotely, if in a call.

The Video Source buttons are used to request the connection to the desired video source. Typical video conferencing systems display two views:
The far site
Either the near site or an alternate video source (DVD, VCR, Document Camera, or PC).
In single-monitor (viewing device) systems, one view is displayed on the main portion of the device. The second view is displayed in a Picture-in-Picture (PIP). In dual-monitor systems, the left monitor displays the far site, the right monitor displays the near site or alternate video source (DVD, VCR, Document Camera, External Computer).
The Audio Controls are comprised of four buttons:
Volume Down
Volume Up
Mute/Unmute Audio
Mute/Unmute Microphone.
Pressing and holding the Volume Up or Down buttons increases or decreases the audio until released. The Mute/Unmute buttons either turn off or turn on the microphone or speaker sound.
There are four Function Controls:
Swap Mode switches the system between video conferencing mode and presentation mode
Logout—places system in idle mode
Open Admin
User Set Up (for maintenance of security passwords)
Cleanse (to clean the CODEC of security sensitive information when it must be serviced)
Main/Back (sends the operation back to the previous action).
The time of day is displayed on the screen.

As such, an invention has been disclosed in terms of a preferred embodiment thereof which fulfills each and every one of the objects of the invention as set forth hereinabove, and provides a new and useful CODEC-driven touch screen video conferencing control system of great novelty and utility.

Of course, various changes, modifications, and alterations in the teachings of the present invention may be contemplated by those of ordinary skill in the art without departing from the intended spirit and scope thereof.

As such, it is intended that the present invention only be limited by the terms of the appended claims.

The invention claimed is:

1. In a video conferencing system including at least one monitor, a conventional remote controller, at least one camera and a coder and decoder (CODEC) facilitating compression of video signals for transmission and de-compression of video signals for display, said CODEC being electrically connected to said camera and monitor and including a receiver for receiving signals from said remote controller, said CODEC having a first port for transmission and receipt of Application Programming Interface (API) signals and a second port for transmission and receipt of capture video signals, the improvement comprising a touch screen remote controller for said video conferencing system comprising:
a) a computer;
b) a video capture device connected to said computer;
c) a touch screen system;
d) said computer being connected to said first port of said CODEC and said video capture device being connected to said second port of said CODEC;

e) said touch screen system being interconnected with said computer directly and via said video capture device;
f) said video capture device including means for capturing a video output of said CODEC corresponding to display on said monitor of areas corresponding to system functions.

2. The improvement of claim 1, wherein said video capture device includes means for supplying said touch screen system with said video output, said video output being displayed as an overlay on a touch screen of said touch screen system.

3. The improvement of claim 2, wherein said overlay includes said areas.

4. The improvement of claim 3, wherein each of said areas on said touch screen is assigned location coordinates, said touch screen system supplying said computer said location coordinates for each said area.

5. The improvement of claim 4, wherein said computer includes a memory with a look-up table, said look-up table being programmed with identification of each area and the location coordinates corresponding thereto.

6. The improvement of claim 5, wherein said touch screen has a touch-sensitive surface, whereby when a region of said touch screen is touched, location coordinates corresponding thereto are transmitted to said computer, whereupon said computer transmits API signals to said CODEC to instruct said CODEC to initiate performance of a function corresponding to said region of said touch screen that was touched.

7. The improvement of claim 1, wherein said CODEC is connected to a Video Cassette Recorder (VCR) and controls operation of said VCR to play programming on said monitor or record programming being displayed on said monitor.

8. The improvement of claim 1, wherein said CODEC is connected to a Digital Video Disc (DVD) player/recorder and controls operation of said DVD to play programming on said monitor or record programming being displayed on said monitor.

9. The improvement of claim 1, wherein said CODEC is connected to a document camera and controls said document camera as needed to record document images.

10. The improvement of claim 6, wherein functions include control of a variety of functions of said camera including zoom and orientation.

11. The improvement of claim 6, wherein functions include control of audio functions of said system including volume and muting/unmuting.

12. The improvement of claim 6, wherein functions include control of recording of data using a VCR and/or DVD player/recorder.

13. The improvement of claim 2, wherein said overlay is solely displayed on said touch screen and not on a screen of said monitor.

14. The improvement of claim 6, wherein said touch screen system includes means for verifying instructions, whereby when a region of said touch screen is touched, before location coordinates corresponding to said region are transmitted to said computer, said touch screen displays a request to verify that a desired region corresponding to a desired instruction has been touched.

15. In a video conferencing system including at least one monitor, a conventional remote controller, at least one camera and a coder and decoder (CODEC) facilitating compression of video signals for transmission and de-compression of video signals for display, said CODEC being electrically connected to said camera and monitor and including a receiver for receiving signals from said remote controller, said CODEC having a first port for transmission and receipt of Application Programming Interface (API) signals and a second port for transmission and receipt of capture video signals, the improvement comprising a touch screen remote controller for said video conferencing system comprising:
a) a computer;
b) a video capture device connected between said computer and said second port of said CODEC;
c) a touch screen system including a touch screen;
d) said computer being connected to said first port of said CODEC to send and receive API signals;
e) said touch screen system being interconnected with said computer directly and via said video capture device; and
f) wherein said video capture device includes means for capturing a video output of said CODEC corresponding to display on said monitor of areas corresponding to system functions, said video capture device including means for supplying through the computer said touch screen system with said video output, said video output being displayed as an overlay on a touch screen of said touch screen system, said overlay including said areas, and said overlay not displayed on a screen of said monitor.

16. The improvement of claim 15, wherein each of said areas on said touch screen is assigned location coordinates, said touch screen system supplying said computer said location coordinates for each said area, said computer including a memory with a look-up table, said look-up table being programmed with identification of each area and the location coordinates corresponding thereto.

17. The improvement of claim 16, wherein said touch screen has a touch-sensitive surface, whereby when a region of said touch screen is touched, location coordinates corresponding thereto are transmitted to said computer, whereupon said computer transmits API signals to said CODEC to instruct said CODEC to initiate performance of a function corresponding to said region of said touch screen that was touched.

18. The improvement of claim 17, wherein said touch screen system includes means for verifying instructions, whereby when a region of said touch screen is touched, before location coordinates corresponding to said region are transmitted to said computer, said touch screen displays a request to verify that a desired region corresponding to a desired instruction has been touched.

* * * * *